(12) United States Patent
Rajaram

(10) Patent No.: US 9,037,552 B2
(45) Date of Patent: May 19, 2015

(54) METHODS FOR ANALYZING A DATABASE AND DEVICES THEREOF

(75) Inventor: Vignesh Rajaram, Nilgiris (IN)

(73) Assignee: Infosys Limited, Bangalore (IN)

( * ) Notice: Subject to any disclaimer, the term of this patent is extended or adjusted under 35 U.S.C. 154(b) by 281 days.

(21) Appl. No.: 13/420,644

(22) Filed: Mar. 15, 2012

(65) Prior Publication Data

US 2013/0166513 A1     Jun. 27, 2013

(30) Foreign Application Priority Data

Dec. 27, 2011    (IN) .......................... 4601/CHE/2011

(51) Int. Cl.
*G06F 17/30*     (2006.01)
*G06F 11/36*     (2006.01)

(52) U.S. Cl.
CPC ...... *G06F 17/30289* (2013.01); *G06F 11/3688* (2013.01)

(58) Field of Classification Search
USPC .................. 707/687, 690, 691, 694; 717/125
See application file for complete search history.

(56) References Cited

U.S. PATENT DOCUMENTS

| | | | |
|---|---|---|---|
| 5,860,011 A * | 1/1999 | Kolawa et al. ................ 717/142 |
| 7,403,954 B2 | 7/2008 | Bornhoevd et al. | |
| 7,526,508 B2 | 4/2009 | Tan et al. | |
| 7,747,606 B2 | 6/2010 | Dageville et al. | |
| 2004/0117759 A1* | 6/2004 | Rippert et al. ................ 717/100 |
| 2006/0168478 A1* | 7/2006 | Zakonov ........................ 714/38 |
| 2008/0270989 A1* | 10/2008 | Ahadian et al. ............... 717/126 |
| 2011/0016356 A1* | 1/2011 | Artzi et al. ...................... 714/38 |

FOREIGN PATENT DOCUMENTS

EP     2219123 A1     8/2010

OTHER PUBLICATIONS

Alvin et al., "A Plan for Structural Dynamics Code and Model Verification and Validation," SPIE Proceedings Series, 4062(2):342-348 (2000).
Illgen et al., "Program Modeling for Fault Definition Based Static Analysis," Computer Science, Engineering of Intelligent Systems, Lecture Notes in Computer Science vol. 2070/2001:911-918 (2001).

* cited by examiner

*Primary Examiner* — Robert Beausoliel, Jr.
*Assistant Examiner* — Nirav K Khakhar
(74) *Attorney, Agent, or Firm* — LeClairRyan, a Professional Corporation

(57) ABSTRACT

A method, non-transitory computer readable medium, and apparatus for analyzing a database includes obtaining SQL code defining one or more databases, each including a plurality of objects, wherein the SQL code is stored on one or more database servers. Defects in the SQL code are identified by applying a plurality of rules to the SQL code. Information regarding each identified defect is stored. The information regarding each identified defect is selectively provided to one or more defect closing interface modules.

18 Claims, 10 Drawing Sheets

| Rule | Criticality |
|---|---|
| Columns involved in joins/where clause should preferably have an index | 3 |
| In DML statements (Select,Update) use subquery when the number of rows returned from a different table is low, else use joins. | 2 |
| Columns involved in joins/where clause should preferably have high selectivity | 3 |
| In a Select Query, all Tables referenced should have a "with (nolock)" clause. | 1 |
| While Querying data, in a Where Clause, "IS NULL" should be avoided in the expression. It makes the expression Non - SARGable | 3 |
| In a Select Query, usage of "Order by" clause degrades the performance. Use it only if absolutely necessary. | 3 |
| Store Procedures should not have a Recompile Option turned ON. | 3 |
| In an Insert Statement, usage of "Select Into" option degrades performance. | 1 |
| Stored Procedures should have the SET NOCOUNT option turned ON. | 1 |
| All Temp tables should be dropped at the end of the SP. | 1 |
| While Querying data if multiple result sets are to be merged, use "UNION" only if distinct values are required. Else Use Union ALL. | 2 |
| While Querying, in a Where Clause, usage of Upper impacts Performance. SQL is case in-sensitive by default. | 1 |
| When optional parameters are used, ensure that unwanted logic is not run. | 1 |
| In Stored Procedures, all Variable Declaration statements should be at the beginning before any DML statements. | 2 |
| If Conditions are used in SP, the enclosed logic should be in another SP. | 3 |
| In a Select Query, Where Clause should not have expression. | 2 |
| Delete statements are preferred to have a where clause. If all rows needs to be deleted, truncate table should be used. | 2 |
| All table creation should be at the beginning of the SP before DML statements. | 1 |
| Cursors should be used only when there is no other way to implement the functionality. | 1 |
| All transaction tables should have a column dtModifiedOn of datatype smalldatetime. | 2 |
| There cannot be more than 1 index on a single column. | 3 |
| If the Data type of a Column in a Table is char(1), the Column name should be prefixed with flg. | 3 |
| While querying a table, the table name should be prefixed with schema name. | 4 |
| Foreign Key Column should have same datatype and size as in Parent table. | 3 |
| While Querying data, in a Where Clause, using "!=" is not ANSI Compliant. | 3 |
| In a Select Query, columns involving in joins can be of identical type and size for better performance. | 2 |
| The data type of a column which is nullable should not be char. | 3 |
| If the character length of a column in a table is high and varying, consider using varchar datatype. | 3 |
| Choose numeric data types based on minimum and maximum value. | 3 |
| Column with character length less than 15 can be char instead of varchar. | 3 |
| Avoid using columns with text datatype. | 3 |
| Avoid using columns with image datatype. | 3 |
| Consider using smalldatetime data type instead of datetime. | 3 |
| Column with character length less than 15 can be char instead of varchar. | 3 |
| Select Column Length based on max character length of the column based on data. | 3 |

FIG. 3

| SP Name | Query | Reviewed Code | Rule | Cat. | Ease Of Fix | Crit. |
|---|---|---|---|---|---|---|
| spTestSCStoredProcName | spTestSCStoredProcName | spTestSCStoredProcName | All table creation should be at the beginning of the SP before DML statements. | Error | Simple | 1 |
| spTestSCStoredProcName | SELECT txtABC ABC FROM testowner.TableName WHERE X = 'Y' | spTestSCStoredProcName | All Tables used in a select query should have with (nolock) clause | Error | Simple | 1 |
| spTestSCStoredProcName | spTestSCStoredProcName | spTestSCStoredProcName | All variable declaration should be at the beginning of the SP. | Error | Simple | 3 |
| spTestSCStoredProcName | select @dtLastmodified = dtLastModified from testowner..TableName with (nolock) where txtProgramName = 'TestSC-ABC' | txtProgramName = 'TestSC-ABC' | Expressions should not be used in where clause column. | Error | Medium | 1 |
| spTestSCStoredProcName | delete from testowner..TableName where intName = @intName | delete from testowner..TableName where intName = @intName | Soft Delete needs to be performed on Production tables. | Error | Medium | 3 |
| spTestSCStoredProcName | CREATE TABLE #temp ( txtName CHAR ( 12 ) ) | CREATE TABLE #temp ( txtName CHAR ( 12 ) ) | All Temp tables should be dropped at the end of the SP. | Error | Simple | 1 |
| spTestSCStoredProcName | select txtName1, txtName1, txtName2 from #tempName where txtName is not null | txtName is not null | Usage of is not clause makes the expression Non-SARGable | Error | Medium | 3 |

FIG. 4B

| Table Name | Column Name | Datatype Name | Length | Observation | Rule | Cat. | Ease Of Fix | Crit. |
|---|---|---|---|---|---|---|---|---|
| TestSCTrnTable Name | txtColumnNa me1 | char | 3 | Data Pattern: Max Character Length is 360. Please relook at the length of the column. | Choose numeric data types based on minimum and maximum value | Error | Medium | 3 |
| TestSCTrnTable Name | fltColumnNa me | float | 8 | Data Pattern - Minimum Value : 0.01. Maximum Value : 92000. Consider using datatype Real | Choose numeric data types based on minimum and maximum value | Error | Medium | 3 |
| TestSCTrnTableN ame | intColumnNa me | int | 4 | Data Pattern - Minimum Value : 1. Maximum Value : 391. Consider using datatype SmallInt | Choose numeric data types based on minimum and maximum value | Error | Medium | 3 |
| TestSCTrnTableN ame | txtColumnNa me2 | varchar | 1000 | Avoid using nullable columns | Avoid using nullable columns | Warning | Difficult | 3 |
| TestSCTrnTableN ame | txtColumnNa me2 | varchar | 12 | Column with character length less than 15 can be char instead of varchar | Column with character length less than 15 can be char instead of varchar | Warning | Medium | 3 |
| TestSCTrnTableN ame | dtColumnNa me | datetime | 16 | Consider using smalldatetime data type | Consider using smalldatetime data type instead of datetime | Error | Medium | 3 |

FIG. 4C

| Object Category | Name | Fragment Name | Observation | Rule | Cat. | Ease Of Fix | Crit. |
|---|---|---|---|---|---|---|---|
| Table | TestSCMstTableName | txtColumn | Column data type name should be prefixed with flg since the datatype is char(1) | Column data type name should be prefixed with flg since the datatype is char(1) | Error | Simple | 4 |
| Stored Procedure | spTestStoredProcName | Declare @txtStatus char (1) | Column data type name should be prefixed with flg since the datatype is char(1) | Column data type name should be prefixed with flg since the datatype is char(1) | Error | Simple | 4 |
| Table | TestSCTrnTableName | uni_seq1 | Unique Constraint name should be prefixed with unq | Unique Constraint name should be prefixed with unq | Error | Simple | 4 |
| Table | TestSCTrnTableName | PK_TestSCTrnTableName | Object Name should be pk_TestSCTrmTableName_intColnfNo | Primary Keys should be named as per guideline | Error | Simple | 4 |
| Table | TestSCTrnTableName | FK_TestSCTrnTableName_TestSCTrnColumnName1 | Object Name should be FK_TestSCTrmTableName_TestSCTrmColumnName1 | Foreign Keys should be named as per guideline | Error | Simple | 4 |
| Table | TestSCTrnTableName | idx_intColumnNo1 | Object Name should be prefixed with idxNC | Indexes should be named as per guideline | Error | Simple | 4 |

FIG. 4D

METHODS FOR ANALYZING A DATABASE AND DEVICES THEREOF

This application claims the benefit of Indian Patent Application Filing No. 4601/CHE/2011, filed Dec. 27, 2011, which is hereby incorporated by reference in its entirety.

FIELD

This technology generally relates to methods and devices for analyzing SQL code defining one or more databases and, more particularly, for identifying defects in the SQL code and providing more efficient methods and devices for facilitating closure of the identified defects.

BACKGROUND

As software applications, including the databases utilized by such applications for data storage and retrieval, become more robust, defects inserted by the application developers tend to become more numerous thereby degrading application quality and performance. For example, large scale applications utilizing large databases with numerous tables and columns inherently provide increased opportunity for allocating an inappropriate amount of memory for column data types too large for the data contained, or intended to be contained, therein. As another example, with larger applications there is generally more opportunity for redundant data and inconsistent dependencies resulting in non-normalized databases and inaccurate data contained therein. Moreover, large scale development efforts typically require a team of developers which may not be utilizing the same naming conventions and/or complying with established guidelines and best practices, thereby increasing the risk of defective code.

Current practices for identifying defects in a database are limited to manual review of the SQL code defining the database which requires substantial resources, particularly in terms of software developer time. Such review is also inherently limited in scope, including in the types of defects that are possible to identify, resulting in code which is not suitable for its intended purpose and/or poor performing and inefficient

SUMMARY

A method for analyzing a database includes obtaining, at a database analyzer apparatus, SQL code defining one or more databases, each including a plurality of objects, wherein the SQL code is stored on one or more database servers. Defects in the SQL code are identified, with the database analyzer apparatus, by applying a plurality of rules to the SQL code. Information regarding each identified defect is stored at the database analyzer apparatus. The information regarding each identified defect is selectively provided, with the database analyzer apparatus, to one or more defect closing interface modules.

A non-transitory computer readable medium having stored thereon instructions for analyzing a database comprising machine executable code which when executed by at least one processor, causes the processor to perform steps including obtaining SQL code defining one or more databases, each including a plurality of objects, wherein the SQL code is stored on one or more database servers. Defects in the SQL code are identified by applying a plurality of rules to the SQL code. Information regarding each identified defect is stored. The information regarding each identified defect is selectively provided to one or more defect closing interface modules.

A database analyzer apparatus including one or more processors, a memory coupled to the one or more processors which are configured to execute programmed instructions stored in the memory including obtaining SQL code defining one or more databases, each including a plurality of objects, wherein the SQL code is stored on one or more database servers. Defects in the SQL code are identified by applying a plurality of rules to the SQL code. Information regarding each identified defect is stored. The information regarding each identified defect is selectively provided to one or more defect closing interface modules.

This technology provides a number of advantages including providing more efficient and comprehensive methods and devices to analyze SQL code defining one or more databases and to identify defects contained therein by parsing SQL code stored on one or more database servers and applying a plurality of rules to the parsed code. Information regarding the identified defects is stored and utilized by one or more defect closing interface modules configured to facilitate closure of the defects by application developers. With this technology, more defects can be identified in a database, a plurality of databases across an enterprise can be analyzed in parallel, defects can be identified faster, and defects can be closed more efficiently, thereby resulting in higher quality and better performing databases and associated applications.

BRIEF DESCRIPTION OF THE DRAWINGS

FIG. 3 is a table of exemplary rules and associated criticality values;

FIG. 4B is a screen shot of an exemplary coding defects and associated defect information spreadsheet of an exemplary spreadsheet defect viewer interface;

FIG. 4C is a screen shot of an exemplary design defects and associated defect information spreadsheet of an exemplary spreadsheet defect viewer interface;

FIG. 4D is a screen shot of an exemplary naming defects and associated defect information spreadsheet of an exemplary spreadsheet defect viewer interface;

DETAILED DESCRIPTION

Figure 1:
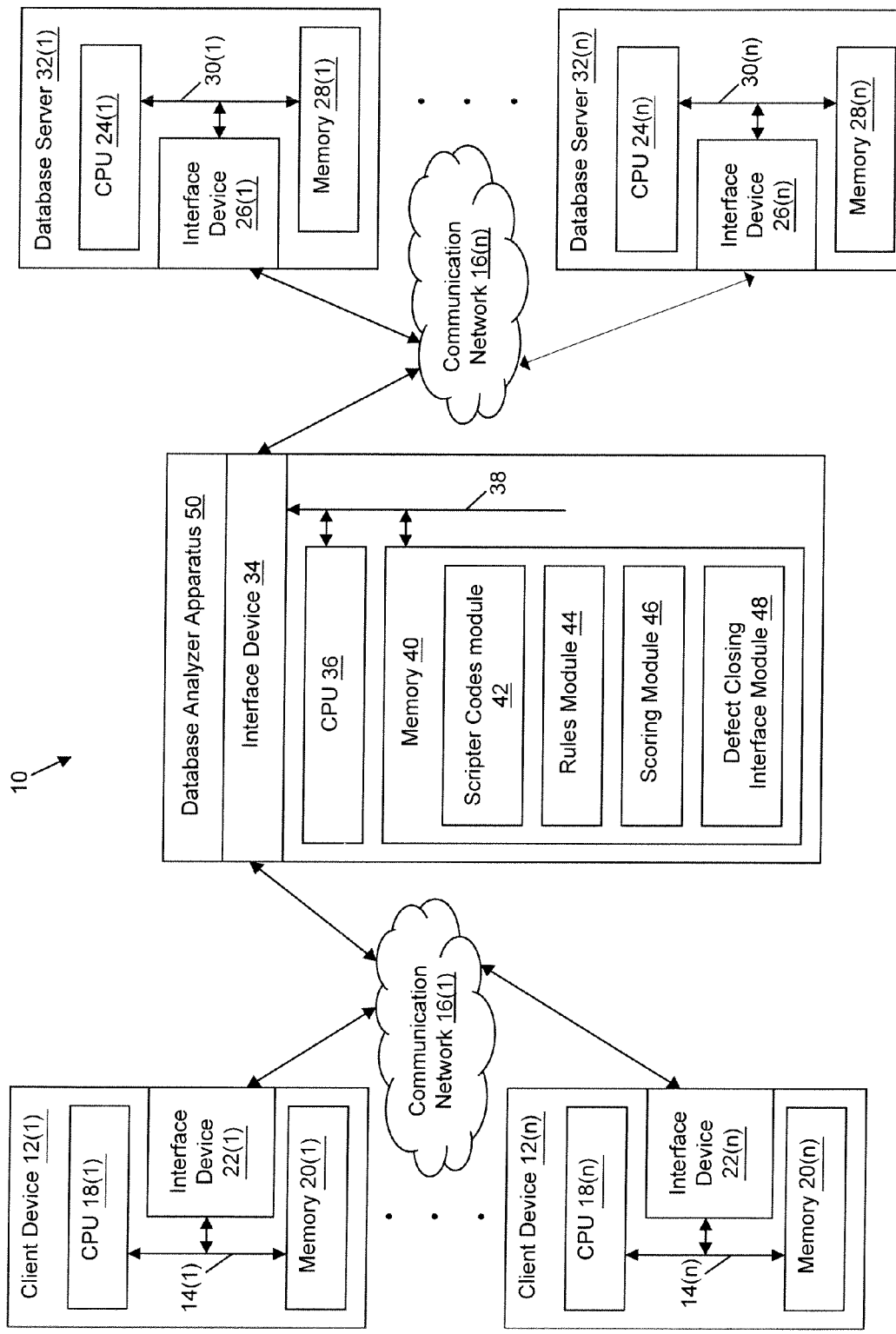
FIG. 1 is an environment with a database analyzer apparatus.
Figure 2:
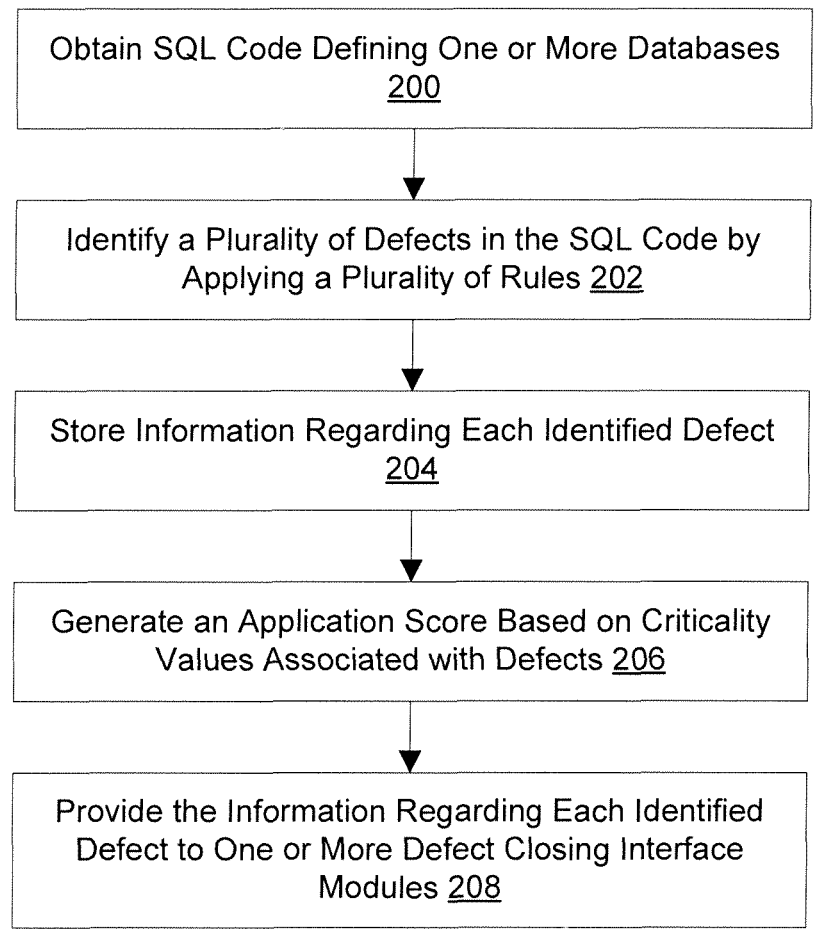
FIG. 2 is a flow chart of an exemplary method for analyzing a database.

An exemplary environment 10 is illustrated in FIG. 1 as including a database analyzer apparatus 50, client devices 12(1)-12(n), and database servers 32(1)-32(n) which are coupled together by communications networks 16(1)-16(n) which may include one or more local area networks and/or wide area networks, although other types and numbers of devices and components in other topologies could be used. This technology provides a number of advantages including providing more effective methods and devices for analyzing SQL databases to identify defects in the SQL code defining the databases, as well as more efficient methods of closing the identified defects, in order to improve database quality and performance.

Each client device 12(1)-12(n) in the environment 10 includes a central processing unit (CPU) 18(1)-18(n) or processor, a memory 20(1)-20(n), and an interface 22(1)-22(n) or I/O system, which are coupled together by a bus 14(1)-14(n) or other link, although other numbers and types of devices, elements, and components in other configurations can be included. The client devices 12(1)-12(n) are coupled to the database analyzer apparatus 50 by one or more communication networks 16(1) in order to facilitate retrieval of database defect information and/or closing of database defects, for example, although this environment 10 can include other numbers and types of systems, devices, components, and elements in other configurations, such as multiple numbers of each of these apparatuses and devices.

The database analyzer apparatus 50 includes at least one CPU 36 including one or more processors, a memory 40, and an interface device 34 which are coupled together by a bus 38 or other link, although other numbers and types of systems, devices, components, and elements in other configurations and locations can be used. The CPU 36 in the database analyzer apparatus 50 executes a program of stored instructions for one or more aspects of the present technology as described and illustrated by way of the examples herein, although other types and numbers of processing devices and logic could be used and the CPU 36 could execute other numbers and types of programmed instructions.

The memory 40 in the database analyzer apparatus 50 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the apparatus or a floppy disk, hard disk, CD ROM, DVD ROM, or other computer readable medium which is read from and written to by a magnetic, optical, or other reading and writing system that is coupled to the processor 36, can be used for the memory 40.

The interface device 34 in the database analyzer apparatus 50 is used to operatively couple and communicate between the database analyzer apparatus 50, and the communication network 16(n) coupled to the database servers 32(1)-32(n). By way of example only, the communications could be based on TCP/IP over Ethernet and industry-standard protocols, including NFS, CIFS, SOAP, XML, LDAP, WBEM, WMI, and SNMP, although other types and numbers of connections, each having their own communications protocols, can be used.

The database servers 32(1)-32(n) can be SQL servers and can each include at least one CPU 24(1)-24(n), a memory 28(1)-28(n), and an interface 26(1)-26(n) or I/O system, which are coupled together by a bus 30(1)-30(n) or other link, although other numbers and types of devices, elements, and components in other configurations can be included. The processor 24(1)-24(n) in the database servers 32(1)-32(n) can execute a program of stored instructions including one or more database management systems (DBMS) for providing database services such as creating, maintaining, and facilitating the use of one or more SQL databases, for example. The memory 28(1)-28(n) in the database servers 32(1)-32(n) stores these programmed instructions, although some or all of the programmed instructions could be stored and executed elsewhere.

It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for analyzing one or more databases will now be described with reference to FIGS. 1-7. In step 200, the database analyzer apparatus 50 obtains SQL code defining one or more databases from one or more database servers 32(1)-32(n), the SQL code including a plurality of objects such as tables and stored procedures, for example. The database analyzer apparatus 50 can obtain SQL code defining a subset of the stored databases or all of the databases stored in the database servers 32(1)-32(n) and thereby the method is scalable and can analyze any number of databases associated with an enterprise. Optionally, the database analyzer apparatus 50 obtains SQL code as instructed by a user through a user interface and based on user input of database identifiers and a corresponding username and password for those identified databases to be analyzed.

In step 202, the database analyzer apparatus 50 identifies a plurality of defects in the SQL code by applying a plurality of rules to the SQL code. The rules can be stored in a rules module 44 of the memory 40. A table including a list of exemplary rules 300 is shown in FIG. 3. For each of the rules, the rules module 44 includes a corresponding procedure, such as a conditional or regular expression, for evaluating a specified SQL code object or code fragment including more than one object. Accordingly, if the rule is violated by the analyzed SQL code, information regarding the defect is stored, at step 204, in the memory 40 or in any other network 16(1)-16(n) accessible data storage.

Optionally, prior to identifying the defects in step 202, the database analyzer apparatus 50 parses all of the obtained SQL code so as to arrange the code in a format better suited for subsequent analysis, as described below. For example, all of the "SELECT" clauses, or any other clause, of all of the stored procedure expressions in the SQL code, and/or all of the column names, can be aggregated. Thereby, the resulting SQL code is structured such that SQL code upon which the same set of rules will be applied can be analyzed more efficiently by the database analyzer apparatus 50.

The rules module 44 can further be configured to store attributes for each rule such as rule summary information, rule category, such as performance, maintainability, or compliance, type of defect resulting from a violation of the rule, such as coding defects, design defects, or naming convention defects, the ease of fixing a defect resulting from a violation of the rule, such as simple, medium, or difficult, whether a violation of the rule results in an error or a warning, and/or a criticality value, such as the criticality values included in the list of criticality values 302 shown in FIG. 3. Optionally, the information regarding each defect stored in the memory 40 at step 204 includes at least some of the rule attributes for each of the violated rules and information regarding the defect location in the code, associated object, or other unique identifier that can subsequently be used to retrieve the relevant defective SQL code and/or object.

In one example, the information regarding each defect stored in memory 40 includes information regarding the object associated with the defect including the object name. In this example, one or more applications utilize a respective one of the databases stored in the database servers 32(1)-32(n) and defined by the SQL code. The database analyzer apparatus 50 includes a scripter code module 42 including a mapping of each application to a unique scripter code. In this example, a name of each object of each database complies with a naming convention requiring inclusion of one of the unique scripter codes in each object name. Accordingly, the scripter code module 42 can be configured to provide an application identifier of the application associated with each defect based on the scripter code included in the name of the object associated with the defect and, thereby, provide a mapping of each defect to a respective application. The database analyzer apparatus 50 can optionally store the respective application identifier in memory 40 as associated with the information regarding each defect.

In this example, each rule is stored in the rules module 44 as associated with at least one criticality value and each defect stored in the memory 40 is associated with the criticality value of the violated rule. As the application association of each defect can be determined by the database analyzer apparatus 50, as described above, the database analyzer apparatus 50 is further optionally configured to generate, using a scoring module 46, an application score based on the criticality values associated with each of the defects associated with each respective application. The scoring module 46 can be configured to retrieve the criticality values associated with each of the defects associated with each of the applications and calculate an application score for each application based on a summation, a weighted summation, an average, a weighted average, or by any other method or combination of methods utilizing the criticality values. Thereby, software developers tasked with closing defects are able to determine, based on the application scores, the relative number of defects present in the application and databases and/or the relative amount of resources likely required to close the defects for each application.

In step 208, the database analyzer apparatus 50 selectively provides the information regarding each defect identified in step 202, as stored in the memory 40 in step 204, to a defect closing interface module 48 configured to generate one or more interfaces based on the information regarding each defect, such as a spreadsheet defect viewer interface, a defect viewer interface 500, a Web-based defect viewer interface 600, or an auto-correct defect viewer interface 700, although any type and number of interfaces, or combination of interfaces, can be generated by the defect closing interface module 48. The interfaces can be accessed by one or more of the client devices 12(1)-12(n) over communications network 16(1) such that a user of a client device 12(1)-12(n), such as a software application developer, can retrieve information about the defects and/or close the defects more efficiently.

Figure 4A:
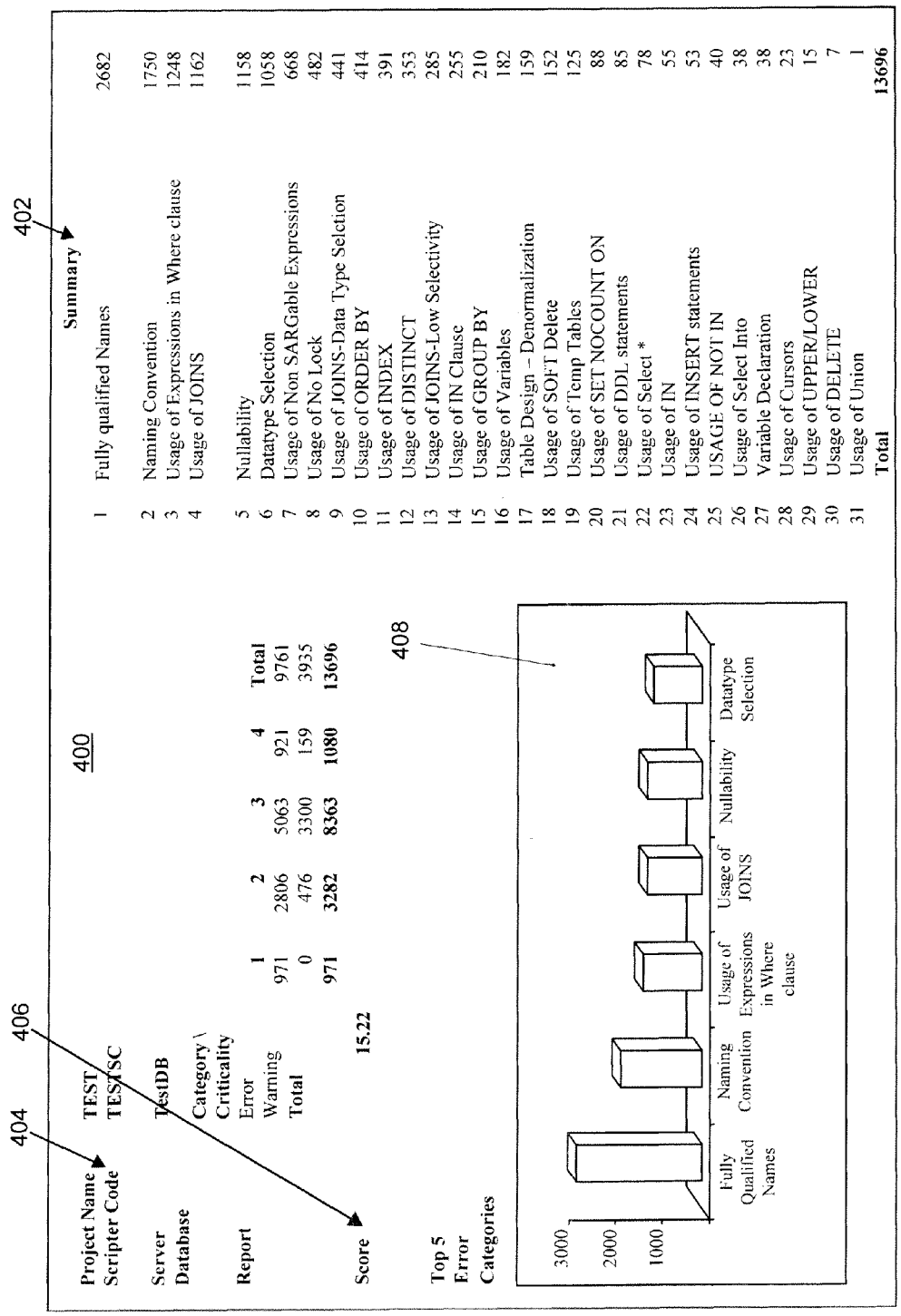
FIG. 4A is a screen shot of an exemplary report spreadsheet of an exemplary spreadsheet defect viewer interface.

In one example, the database analyzer apparatus 50 provides the defect closing interface module 48 with the information regarding each defect as stored in memory 40 and the defect closing interface module 48 is configured to generate a spreadsheet defect viewer interface, various exemplary screen shots of which are shown in FIGS. 4A-4D. In FIG. 4A, a screen shot of an exemplary report spreadsheet 400 of an exemplary spreadsheet defect viewer interface is shown. The exemplary report spreadsheet 400 is optional and for informational purposes only and other reports regarding the defects identified at step 202 can include other information. The exemplary report spreadsheet 400 includes a listing of the rule summary information 402 for a plurality of the rules violated by the SQL code associated with one application. The relevant application identifier, or project name, is communicated to the defect closing interface module 48 by the scripter code module 42 which determines the application identifier based on the "TestSC" scripter code 404, as described above. The listing of the rule summary information includes the number of defects associated with the rule associated with each rule summary in the list 402 and the exemplary bar graph 408 includes a subset of the same information in graphical form. The exemplary report spreadsheet 400 further includes an application score of 15.22, calculated by the scoring module 46, as described above, and communicated to the defect closing interface module 48. The exemplary report spreadsheet 400 further includes the number of defects associated with each criticality value as determined based on the criticality value rule attributes associated with each of the rules violated by the SQL code associated with the application.

The spreadsheet defect viewer interface further includes a coding defects spreadsheet 420, which includes associated defect information, an exemplary screen shot of which is shown in FIG. 4B. The coding defects spreadsheet 420 includes a row for each defect resulting from a violation of a rule having a "coding" type of defect attribute. Exemplary columns include the stored procedure name 422 referring to the stored procedure object associated with the defect, the query 424 associated with the defect, the reviewed code 420, referring to the SQL code fragment in violation of the rule, the rule violated 426, the category attribute 428 associated with the violated rule, the ease of fix attribute 430 associated with the violated rule, and the criticality value attribute 432 associated with the violated rule. With this information, a software application developer can locate in the SQL code all of the identified defects resulting from a failure to comply with established coding best practice in order to close one or more of the coding defects, if desired.

The spreadsheet defect viewer interface further includes a design defects spreadsheet 458, which includes associated defect information, an exemplary screen shot of which is shown in FIG. 4C. The design defects spreadsheet 458 includes a row for each defect resulting from a violation of a rule having a "design" type of defect attribute.

One exemplary design defects is a failure to optimize data type selection. A plurality of rules regarding data type optimization 304 are shown in FIG. 3, although other rules may be provided. The database analyzer apparatus 50 can identify data type optimization defects, at step 202, for databases that have been previously populated with data. Accordingly, in one example, a subset of the rules provided by the rules module 44 can be configured to identify defects, when applied to SQL code by the database analyzer apparatus 50 at step 202, only in populated databases. A failure to optimize data type selection for columns of tables can result in substantial unnecessary memory allocation thereby degrading application and/or database performance.

In one example, in order to apply the "Choose numeric data types based on minimum and maximum value" rule 306, and identify any associated data type optimization design defects, the database analyzer apparatus 50 communicates with one or more of the database servers 32(1)-32(n) over communication network 16(n) to scan all of the data contained in each column populated with data in each table in each database to determine at least the maximum size of the data contained therein, such as the physical storage size required to store the data and/or the maximum value of the data. The database analyzer apparatus 50 optionally maintains a mapping of each column and the maximum size of the associated data in the memory 40.

In one example, the database analyzer apparatus 50 then compares the maximum size of the data to a maximum size of a plurality of data types, as determined according to the data type established for the column by the relevant SQL code. For example, if the data type established for the column by the relevant SQL code is an integer, the database analyzer apparatus 50 can compare the maximum size of the data to a maximum size of other numerical data types such as tiny integer, small integer, float, and real data types.

In this example, the database analyzer apparatus 50 determines, based on the comparison, whether an established data type for each column populated with data is optimal. Referring to the defect 459, the maximum value of the data contained in the intColumnName column is 391 and the data type established for the column is an integer, as determined from the column name or the SQL code defining the column. Accordingly the data type is not optimized as a small integer is capable of storing signed values up to $2^{15}-1$ or 32,767, which is large enough to store the maximum value of 391. The small integer requires less memory allocation than the integer data type currently associated with relevant column. Additionally, the next smallest data type, the tiny integer, is only capable of storing signed values up to $2^8-1$ or 255, which is less than the maximum value of 391 and would therefore not be an appropriate data type selection for the relevant column.

Another example of a design defect is a failure to optimally normalize a database resulting in redundancy and/or inconsistent dependencies which reduce the quality of the database and the accuracy of the data contained therein. Accordingly, in one example, the database analyzer apparatus 50 is configured to apply one or more rules to the SQL code, at step 202, to identify defects resulting form repeated columns in multiple tables, multiple primary keys for one set of related data, and columns that do not depend on the primary or foreign key, for example.

Accordingly, the design defect spreadsheet 458 can include columns such as the table name 442, the column name 444, the data type name 446, the length of the data type, such as number of bytes, the observation 440 related to each defect made by the database analyzer apparatus 50 after applying the rules, the rule violated 450, the category attribute 452 associated with the violated rule, the ease of fix attribute 454 associated with the violated rule, and the criticality values attribute 456 associated with the violated rule. With this information, a software application developer can locate in the SQL code all of the identified defects resulting from a failure to comply with established database design best practice in order to close one or more of the design defects, if desired.

The spreadsheet defect viewer interface further includes a naming defects spreadsheet 480, which includes associated defect information, an exemplary screen shot of which is shown in FIG. 4D. The naming defects spreadsheet 402 includes a row for each defect resulting from violation of a rule having a "naming" type of defect attribute. Exemplary columns include the object category 462, such as a table or a stored procedure, for example, associated with the defect, the name of the object 464, the SQL code fragment name 468, such as the column name or the variable declared, for example, the observation 460 made by the database analyzer apparatus 50 after applying the rule, which can include a suggested code revision which would close the defect, the rule violated 470, the category attribute 472 associated with the violated rule, the ease of fix attribute 474 associated with the violated rule, and the criticality values attribute 476 associated with the violated rule. With this information, a software application developer can locate in the SQL code all of the identified defects resulting from a failure to comply with established naming convention best practice in order to close one or more of the naming defects, if desired.

While the exemplary spreadsheet defect viewer interface has been described with reference to multiple spreadsheets, all of the defect information can be provided on one spreadsheet and/or one spreadsheet document including multiple tabs. Additionally, the information for each defect has been shown in the various spreadsheets 400, 420, 458, and 480 for exemplary purposes only and various other output and/or display of defect information can be provided.

Figure 5:
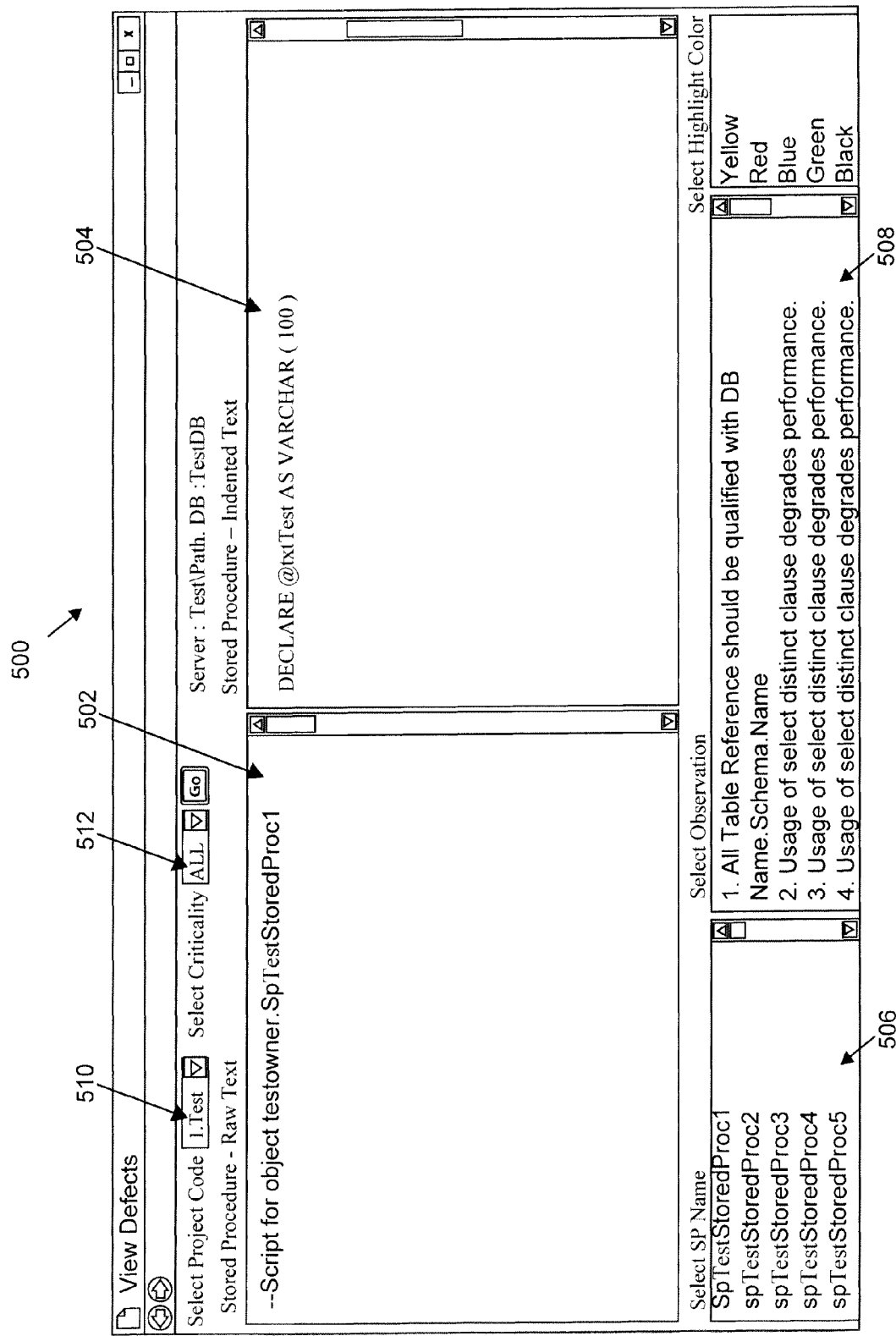
FIG. 5 is a screen shot of an exemplary defect viewer interface.

While the spreadsheet defect viewer identifies the defects in the SQL code for software application developers to close, revising the SQL code to close the defects can be a laborious process. Accordingly, in another example, the defect closing interface module 48 generates a defect viewer interface 500, an exemplary screen shot of which is shown in FIG. 5. The defect viewer interface can be accessed by a client device 12(1)-12(n) using network 16(1), for example. In order to view and optionally close defects for a specification application and/or project, a user of the client device 12(1)-12(n) can interact with the project code menu 510 to select the scripter code associated with the application and/or project. By interacting with the criticality menu 512, a user of the client device 12(1)-12(n) can select only those defects violating rules having an associated relatively high criticality value attribute, for example. According to the user's selections, the defect closing interface module 48 can retrieve the requested defect information from the memory 40 of the database analyzer apparatus 50. While the project code 510 and criticality 512 menus are shown on the exemplary defect viewer interface 500, other filters can be provided.

Upon selecting values for any of the filters, the objects are shown, such as in an object list 506, which have at least one identified defect. In this example, upon user selection of one of the stored procedures in the object list 506, all of the defects associated with the stored procedures are displayed, such as in an observation list 508. In another example, the object list 506 includes a plurality of table names, although any database object having a unique identifier could be included in the object list 506. Upon user selection of one of the defects in the observation list, the SQL code as stored on one or more of the database servers 32(1)-32(n) is retrieved by the defect closing interface module 48 and displayed in a SQL code review portion 504 of the interface 500 allowing a user, such as a software application developer, to revise the SQL code in order to close the selected defect. Optionally, the defective SQL code associated with the selected defect can be highlighted to further improve the client device 12(1)-12(n) user experience. Accordingly, the defect viewer interface 500 presents a comprehensive listing of identified defects and allows software application developers to close defects relatively quickly resulting in higher quality databases that can be deployed on a reduced time schedule.

Figure 6:
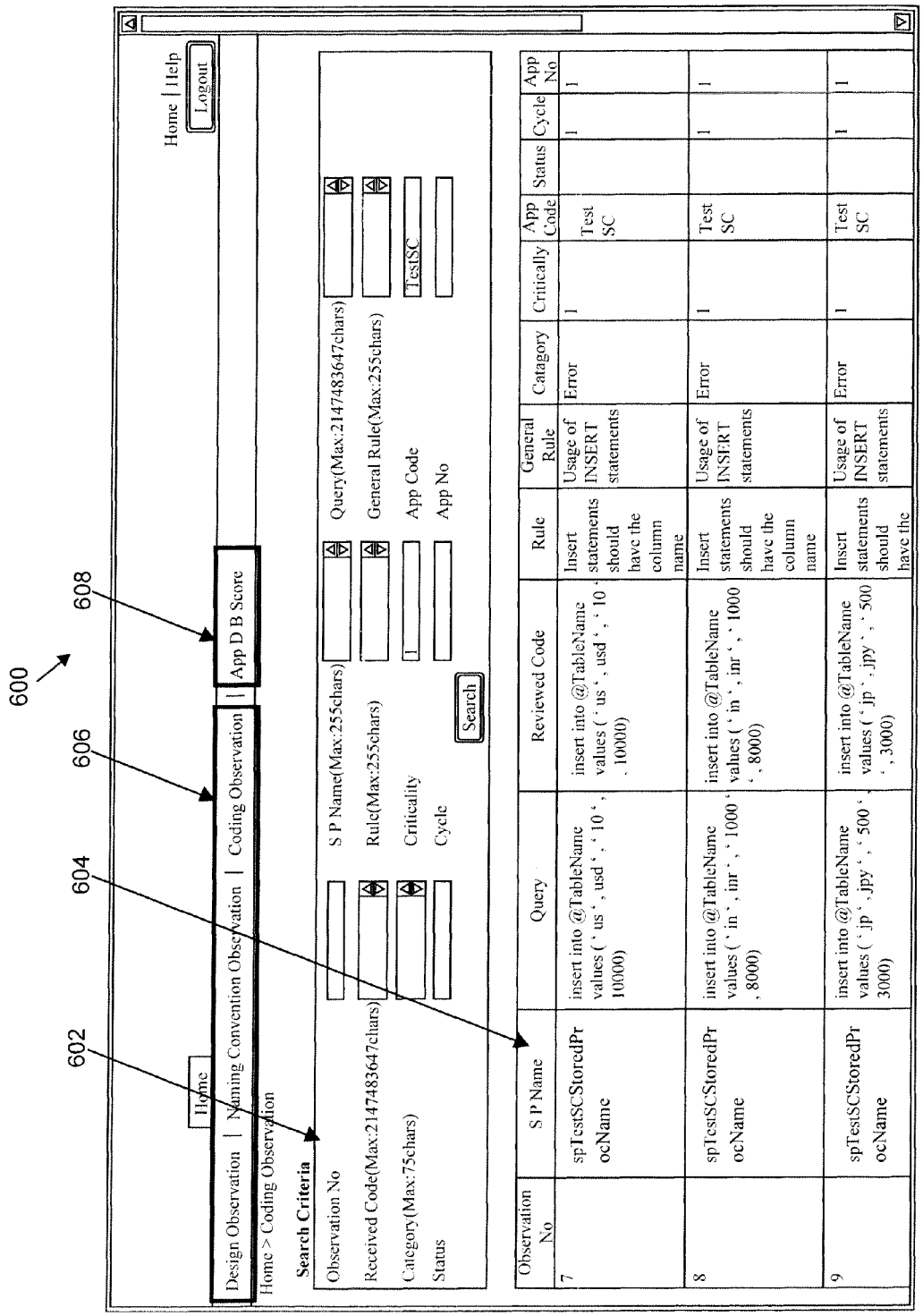
FIG. 6 is a screen shot of an exemplary Web-based defect viewer interface.

Referring to FIG. 6, a screen shot of an exemplary Web-based defect viewer interface 600 is shown. While the defect viewer interface 500 can also be available to authenticated users over a wide area communications network 16(1), the Web-based defect viewer interface 600 provides additional flexibility through search criteria panel 602 allowing a user to search the identified defects and associated information stored in step 202, based upon a plurality of parameters such as stored procedure name, rule violated, and/or rule category attribute, in addition to the scripter code and criticality value filters provided by the defect viewer interface 500. The result set of a search performed according to the selected parameter values is displayed in an observation panel 604 of the Web-based defect viewer interface allowing a user of a client devise 12(1)-12(n), such as a software application developer, to view information regarding identified defects. The result set shown in FIG. 6 is for exemplary purposes only and other defect and/or rule attribute information can be provided. With this information, a software application developer can locate in the SQL code the defects included in the result set in order to close one or more of the defects, if desired. A further filter can optionally be provided based on the type of defect rule attribute according to the hyperlinks 606. Accordingly, user interaction with one of the design, naming convention, or coding convention observation hyperlinks 606 can cause the defect closing interface module 48 to provide the Web-based defect viewer 600 with defect information for defects resulting from a violation of a rule having a specified defect type attribute. Also optionally, an application database score hyperlink 608 can be provided which, when selected by a user of a client device 12(1)-12(n), can cause the database analyzer apparatus 50 to generate an application score for a specified application, as described above with respect to step 206.

Figure 7:
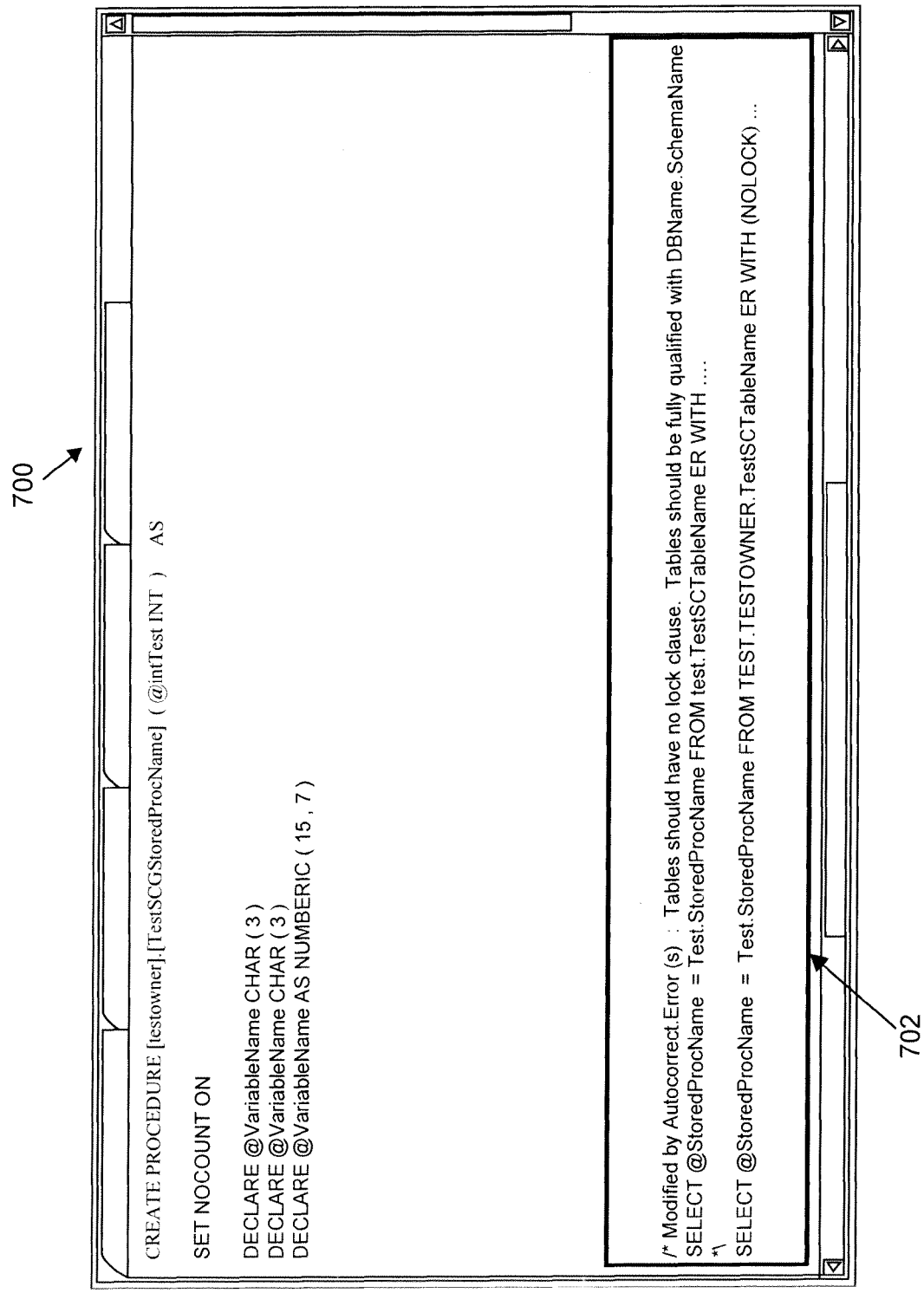
FIG. 7 is a screen shot of an exemplary auto-correct defect viewer interface.

Referring to FIG. 7, a screen shot of an exemplary auto-correct defect viewer interface 700 is shown. The database analyzer apparatus 50 can optionally be configured to automatically revise the SQL code to close at least a subset of the defects, and/or suggest SQL code revisions that may close one or more defects. Such auto-correction is particularly useful with respect to naming convention defects requiring a revision in the object name to close, for example. However, other defects including coding and design defects, such as the data type optimization defects described above, can also be automatically closed. For such automatically closed defects, the database analyzer apparatus 40 can revise the SQL code by including comment(s) for every closed defect to identify rule and/or defect information and, optionally, the code portion as it existed prior to the automatic revision. Accordingly, the defect closing interface module 48 can generate an auto-correct defect viewer interface 700 including the SQL code 702 and associated comments for review by a user, such as a software application developer. Thereby, defects can be closed without user interaction with the SQL code, or by a limited review of the automatic SQL code revisions closing the defects, resulting in higher quality code capable of being deployed with increased confidence and on a reduced time schedule.

The interfaces described above have been included for exemplary purposes only and other types of interfaces including other types of content can be provided to display information regarding defects identified in step 202 and as stored in the memory 40 in step 204.

Accordingly, as illustrated and described with the examples herein this technology provides more effective methods and devices for analyzing databases defined by SQL code. The technology provides automated methods and devices for identifying defects in SQL code based on a plurality of rules defined based on established guidelines and best practices. Information regarding the identified defects is provided to a defect closing interface module configured to generate one or more defect closing interfaces which, when utilized by software application developers, facilitates more efficient closing of defects. Thereby, the quality and performance of analyzed databases and associated applications is improved.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for analyzing at least one database, the method comprising:
 identifying, with a database analyzer apparatus, a plurality of defects in structured query language (SQL) code by applying a plurality of rules to the SQL code and without executing the SQL code, wherein each of the defects is identified based on a violation of one of the rules and the SQL code defines at least a plurality of tables together comprising a database;
 storing, at the database analyzer apparatus, information regarding each identified defect; and
 outputting, with the database analyzer apparatus, at least a portion of the information regarding at least a subset of the identified defects and a score generated based on the rules violated by the identified defects.

2. The method as set forth in claim 1 wherein at least one of the information or the score is output to a defect closing interface selected from at least one of a spreadsheet defect viewer, a defect viewer, a Web-based defect viewer, or an auto-correct defect viewer.

3. The method as set forth in claim 1 wherein each of the plurality of rules is associated with at least one criticality value and the method further comprises:
 generating, with the database analyzer apparatus, the score based at least in part on the criticality values associated with the rules violated by the plurality of defects.

4. The method as set forth in claim 1 wherein the database comprises a plurality of databases, each of a plurality of applications utilize a respective one of the plurality of databases defined by the SQL code, each of the plurality of applications is associated with a unique scripter code, a name of each object includes one of the unique scripter codes, and each defect is associated with at least one of the objects, the method further comprising:
 identifying, with the database analyzer apparatus, one of the plurality of applications associated with each defect based on the scripter code included in the name of one of the objects associated with the defect; and wherein the information regarding each identified defect further includes the application with which the defect is associated.

5. The method as set forth in claim 1 wherein the identified defects are each associated with a defect type selected from coding defects, design defects, or naming convention defects and wherein the information regarding each identified defect further includes the defect type.

6. The method as set forth in claim 1 wherein the each of the plurality of tables at least one row and at least one column populated with data, and the identifying a plurality of defects further comprises:

determining at least a maximum size of the data for each column populated with data; and determining whether an established data type for each column populated with data is optimal.

7. A non-transitory computer readable medium having stored thereon instructions for analyzing at least one database comprising machine executable code which when executed by at least one processor, causes the processor to perform steps comprising:

identifying a plurality of defects in structured query language (SQL) code by applying a plurality of rules to the SQL code and without executing the SQL code, wherein each of the defects is identified based on a violation of one of the rules and the SQL code defines at least a plurality of tables together comprising a database;

storing information regarding each identified defect; and outputting, with the database analyzer apparatus, at least a portion of the information regarding at least a subset of the identified defects and a score generated based on the rules violated by the identified defects.

8. The medium as set forth in claim 7 wherein at least one of the information or the score is output to a defect closing interface selected from at least one of a spreadsheet defect viewer, a defect viewer, a Web-based defect viewer, or an auto-correct defect viewer.

9. The medium as set forth in claim 7 wherein each of the plurality of rules is associated with at least one criticality value the medium further having stored thereon instructions for analyzing a database comprising machine executable code which when executed by the at least one processor, causes the processor to perform steps further comprising:

generating the score based at least in part on the criticality values associated with the rules violated by the plurality of defects.

10. The medium as set forth in claim 7 wherein the database comprises a plurality of databases, each of a plurality of applications utilize a respective one of the plurality of databases defined by the SQL code, each of the plurality of applications is associated with a unique scripter code, a name of each object includes one of the unique scripter codes, and each defect is associated with at least one of the objects, the medium further having stored thereon for analyzing a database comprising machine executable code which when executed by the at least one processor, causes the processor to perform steps further comprising:

identifying one of the plurality of applications associated with each defect based on the scripter code included in the name of one of the objects associated with the defect; and wherein the information regarding each identified defect further includes the application with which the defect is associated.

11. The medium as set forth in claim 7 wherein the identified defects are each associated with a defect type selected from coding defects, design defects, or naming convention defects and wherein the information regarding each identified defect further includes the defect type.

12. The medium as set forth in claim 7 wherein the each of the plurality of tables at least one row and at least one column populated with data, and the identifying a plurality of defects further comprises:

determining at least a maximum size of the data for each column populated with data; and determining whether an established data type for each column populated with data is optimal.

13. A database analyzer apparatus, comprising:

one or more processors; and a memory coupled to the one or more processors which are configured to execute programmed instructions stored in the memory comprising:

identifying a plurality of defects in structured query language (SQL) code by applying a plurality of rules to the SQL code and without executing the SQL code, wherein each of the defects is identified based on a violation of one of the rules and the SQL code defines at least a plurality of tables together comprising a database;

storing information regarding each identified defect; and outputting, with the database analyzer apparatus, at least a portion of the information regarding at least a subset of the identified defects and a score generated based on the rules violated by the identified defects.

14. The apparatus as set forth in claim 13 wherein at least one of the information or the score is output to a defect closing interface selected from at least one of a spreadsheet defect viewer, a defect viewer, a Web-based defect viewer, or an auto-correct defect viewer.

15. The apparatus as set forth in claim 13 wherein each of the plurality of rules is associated with at least one criticality value and the memory coupled to the one or more processors is further configured to execute programmed instructions stored in the memory further comprising:

generating the score based at least in part on the criticality values associated with the rules violated by the plurality of defects.

16. The apparatus as set forth in claim 13 wherein the database comprises a plurality of databases, each of a plurality of applications utilize a respective one of the plurality of databases defined by the SQL code, each of the plurality of applications is associated with a unique scripter code, a name of each object includes one of the unique scripter codes, each defect is associated with at least one of the objects, and the memory coupled to the one or more processors is further configured to execute programmed instructions stored in the memory further comprising:

identifying one of the plurality of applications associated with each defect based on the scripter code included in the name of one of the objects associated with the defect; and wherein the information regarding each identified defect further includes the application with which the defect is associated.

17. The apparatus as set forth in claim 13 wherein the identified defects are each associated with a defect type selected from coding defects, design defects, or naming convention defects and wherein the information regarding each identified defect further includes the defect type.

18. The apparatus as set forth in claim 13 wherein the each of the plurality of tables at least one row and at least one column populated with data, and the identifying a plurality of defects further comprises:
   determining at least a maximum size of the data for each column populated with data; and
   determining whether an established data type for each column populated with data is optimal.

* * * * *